US007373365B2

(12) United States Patent
Varadarajan et al.

(10) Patent No.: US 7,373,365 B2
(45) Date of Patent: May 13, 2008

(54) SYSTEM AND METHOD FOR AUTOMATIC INDEXING AND ARCHIVING OF PAPER DOCUMENTS

(75) Inventors: Sridhar Varadarajan, Bangalore (IN); Ravi G. Amur, Bangalore (IN); Korrapati Kalyana Rao, Bangalore (IN)

(73) Assignee: Satyam Computer Services, Ltd. (IN)

( * ) Notice: Subject to any disclaimer, the term of this patent is extended or adjusted under 35 U.S.C. 154(b) by 460 days.

(21) Appl. No.: 10/823,293

(22) Filed: Apr. 13, 2004

(65) Prior Publication Data

US 2005/0226261 A1    Oct. 13, 2005

(51) Int. Cl.
*G06F 12/00* (2006.01)
(52) U.S. Cl. .................. 707/204; 382/305; 382/306; 345/418
(58) Field of Classification Search ................ 707/204; 382/305, 306; 345/418
See application file for complete search history.

(56) References Cited

U.S. PATENT DOCUMENTS 6,043,819 A * 3/2000 LeBrun et al. .............. 345/418
6,427,032 B1 * 7/2002 Irons et al. ................. 382/306
6,456,747 B2 * 9/2002 Altman ....................... 382/305
2002/0083079 A1 * 6/2002 Meier et al. ............... 707/104.1
2003/0235345 A1 * 12/2003 Stalcup et al. ............. 382/305

* cited by examiner

*Primary Examiner*—Don Wong
*Assistant Examiner*—Marie Antoinette Cabucos
(74) *Attorney, Agent, or Firm*—The Webb Law Firm

(57) ABSTRACT

Enterprises deal with a lot of papers in their day-to-day activities. Many of these papers are company confidential documents and many are legal documents with a statutory requirement that they be preserved for a pre-specified number of years. During the course of time, there is a need to (a) obtain copies of these papers; and (b) modify the contents. Such frequent handling of papers may reduce the life of the papers and lead to statutory violations. A system for automatic indexing and retrieval of paper documents involves (a) storing paper documents in a secured manner in both hard and soft forms; (b) indexing of both forms of the stored paper documents; (c) retrieving soft form of a paper document for display and copying; (d) retrieving hard form of a paper document for modification and removal; (e) managing multiple versions of the paper documents; and (e) access control and audit trailing. It is essential to maintain consistency between hard and soft forms, and image processing techniques are deployed to ensure consistency between hard and soft forms. Another form of consistency that is required to be ensured is the correct cataloging and indexing of paper documents. This is achieved by comparing input information with the contents of the cover page of a paper document to account for human input errors.

4 Claims, 17 Drawing Sheets

DESCRIPTION OF A FOLDER

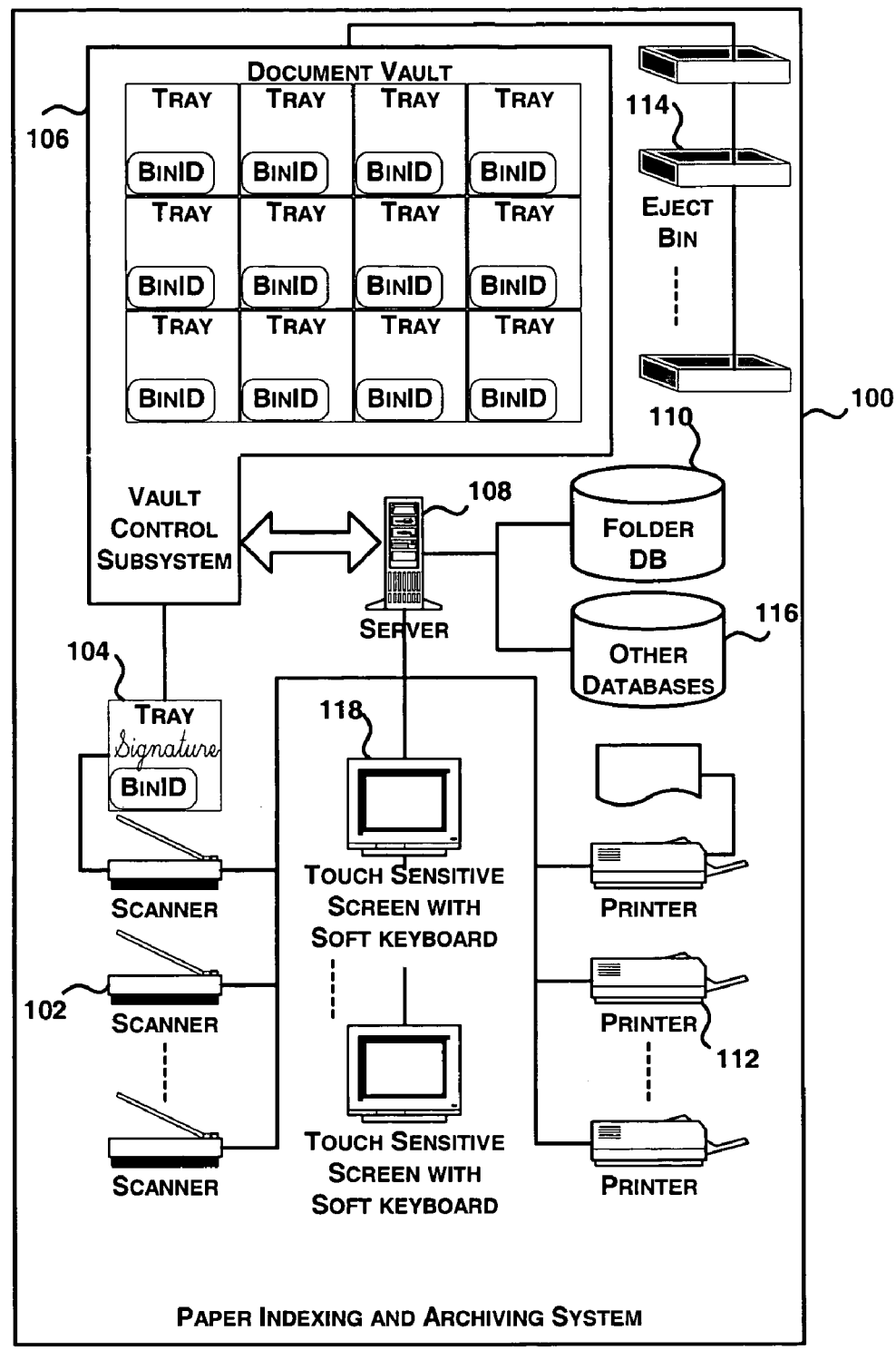
FIG. 1: SYSTEM ARCHITECTURE OF PAPER INDEXING AND ARCHIVING SYSTEM

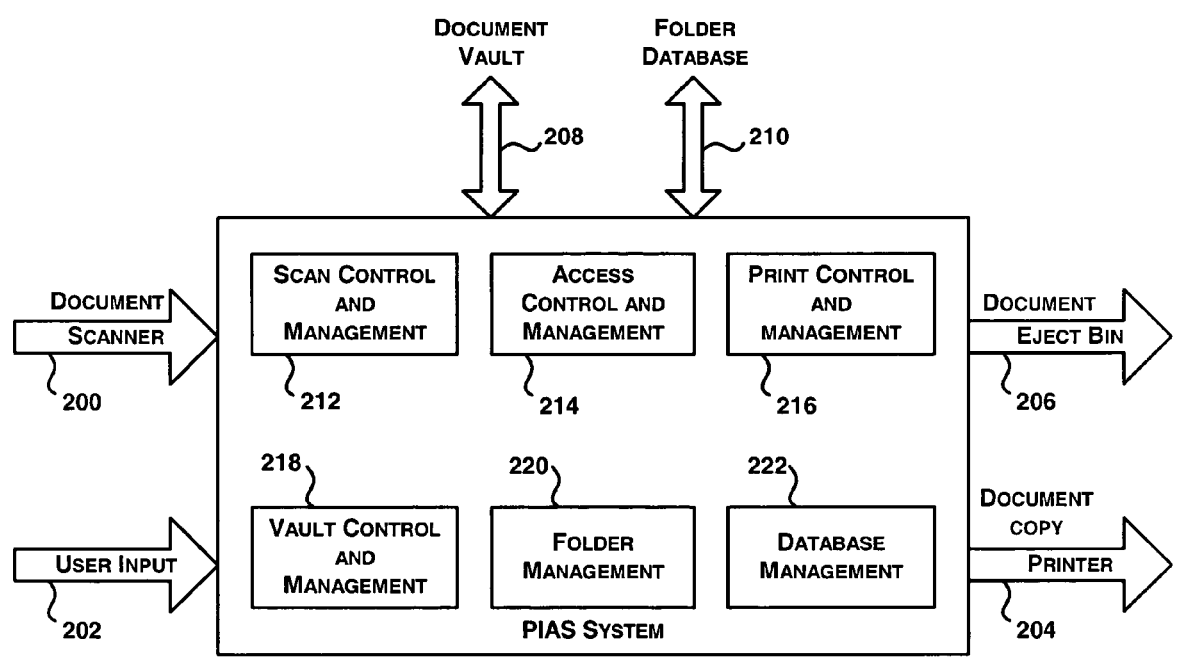
FIG. 2: PIAS SUBSYSTEMS

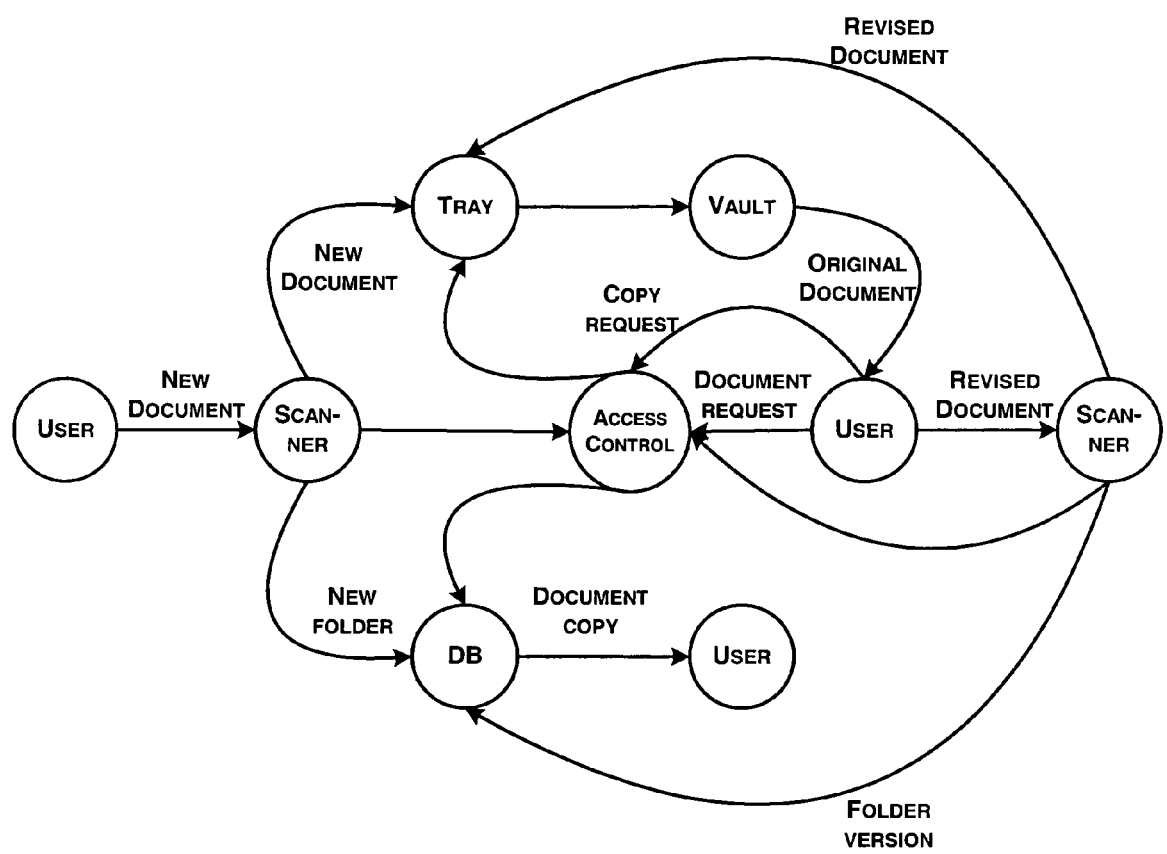
FIG. 3: A TYPICAL WORKFLOW

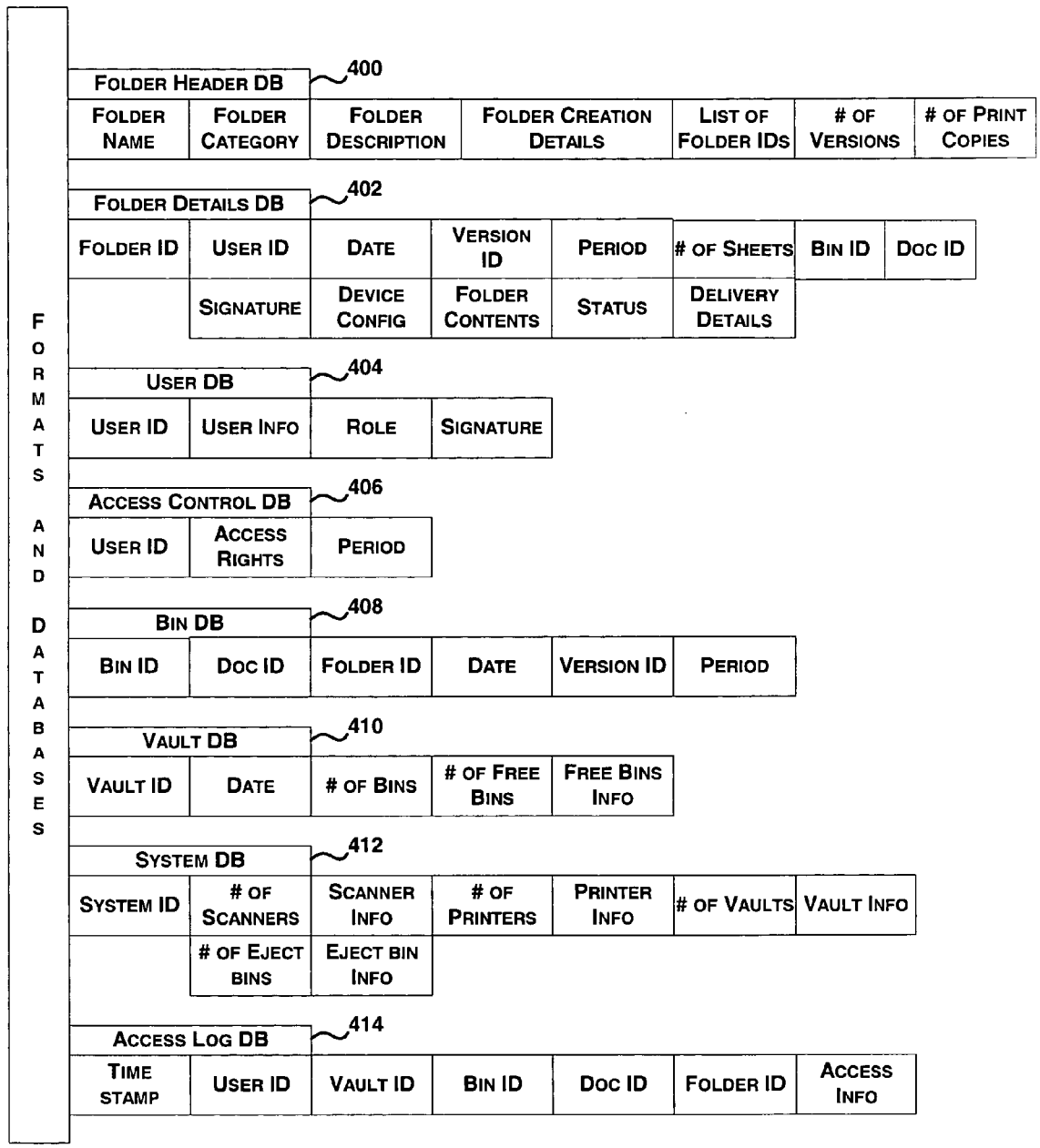
FIG. 4: DESCRIPTION OF DATABASES

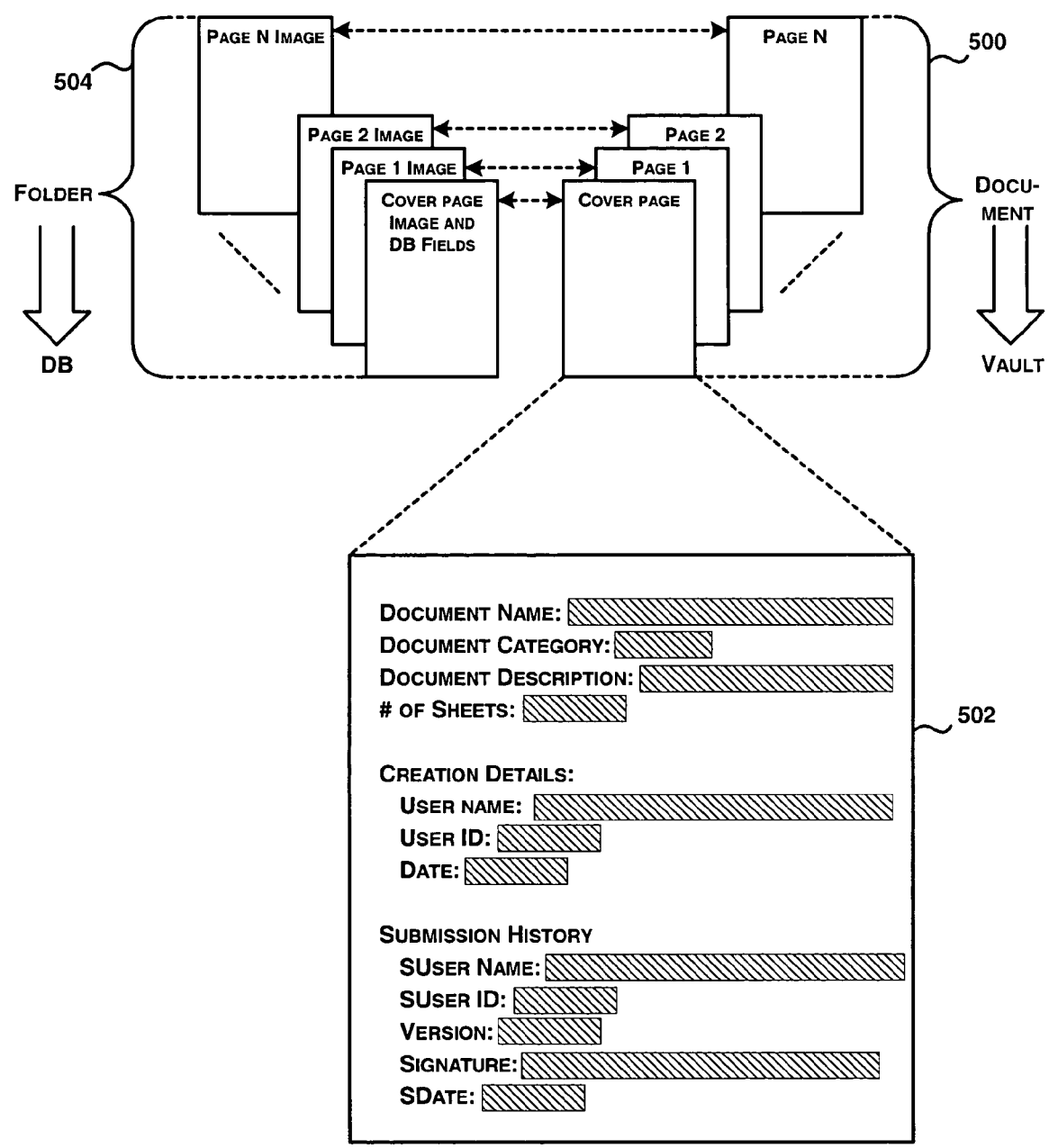
FIG. 5: DESCRIPTION OF A FOLDER

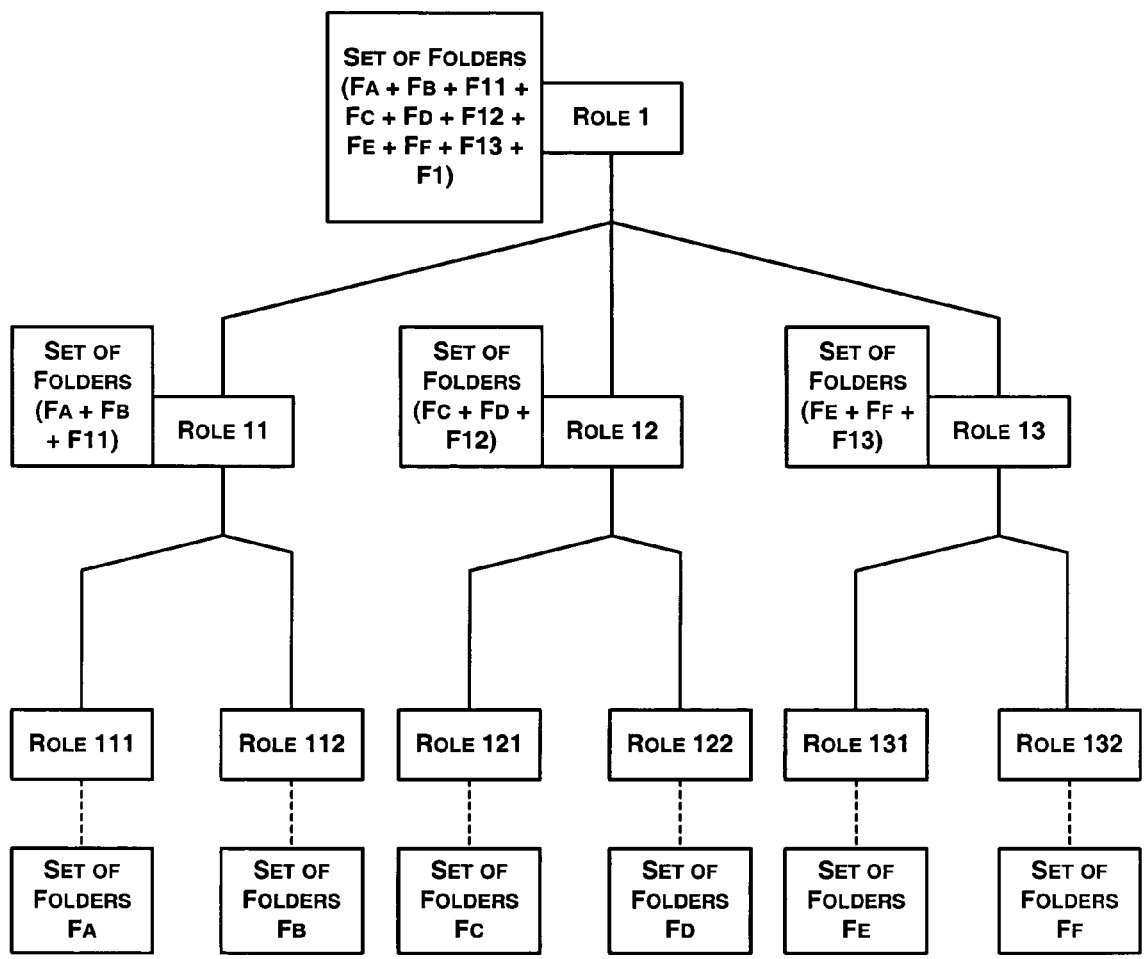
FIG. 6: ROLE BASED ACCESS RIGHTS

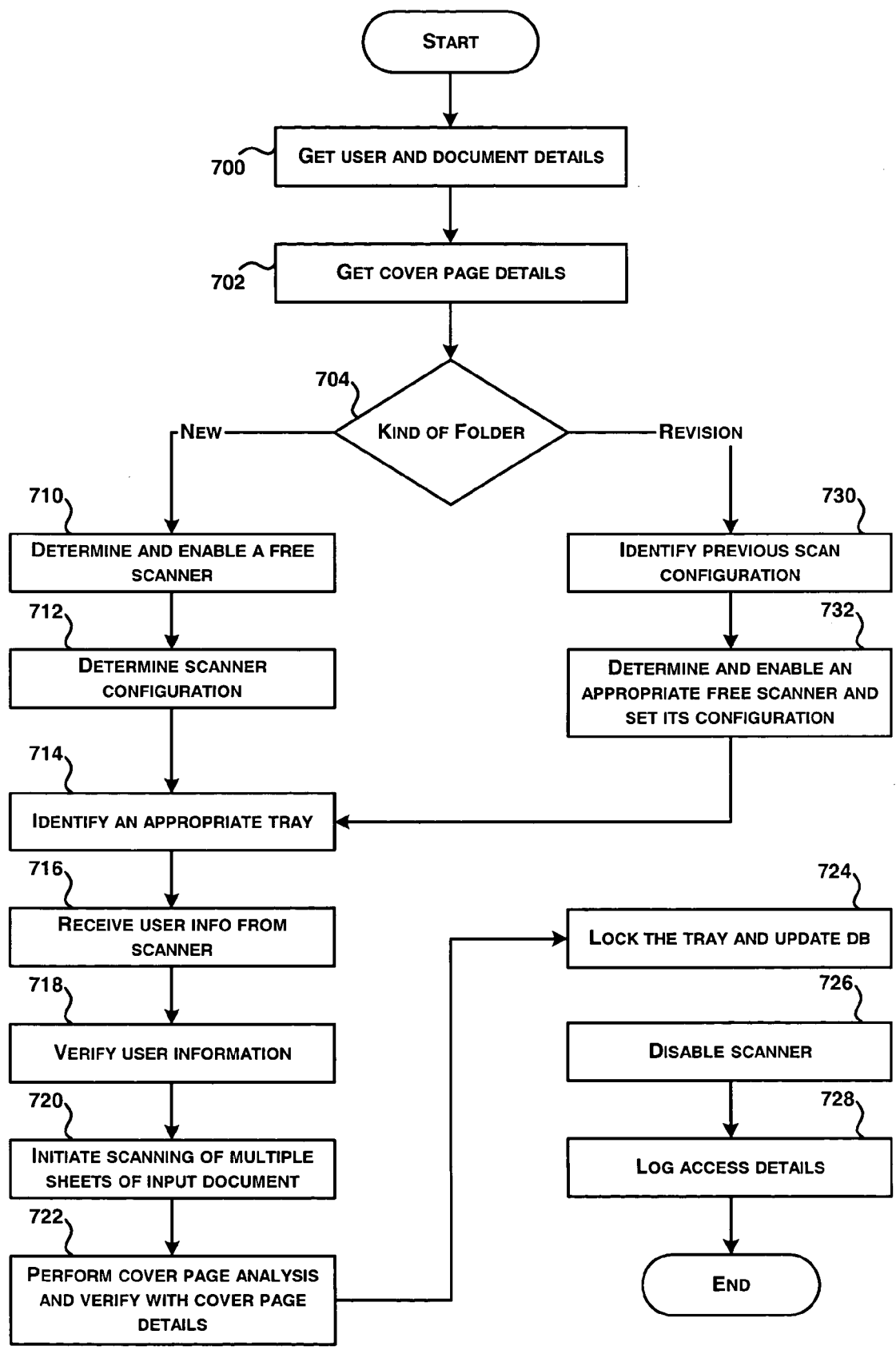
FIG. 7: SCAN MANAGEMENT

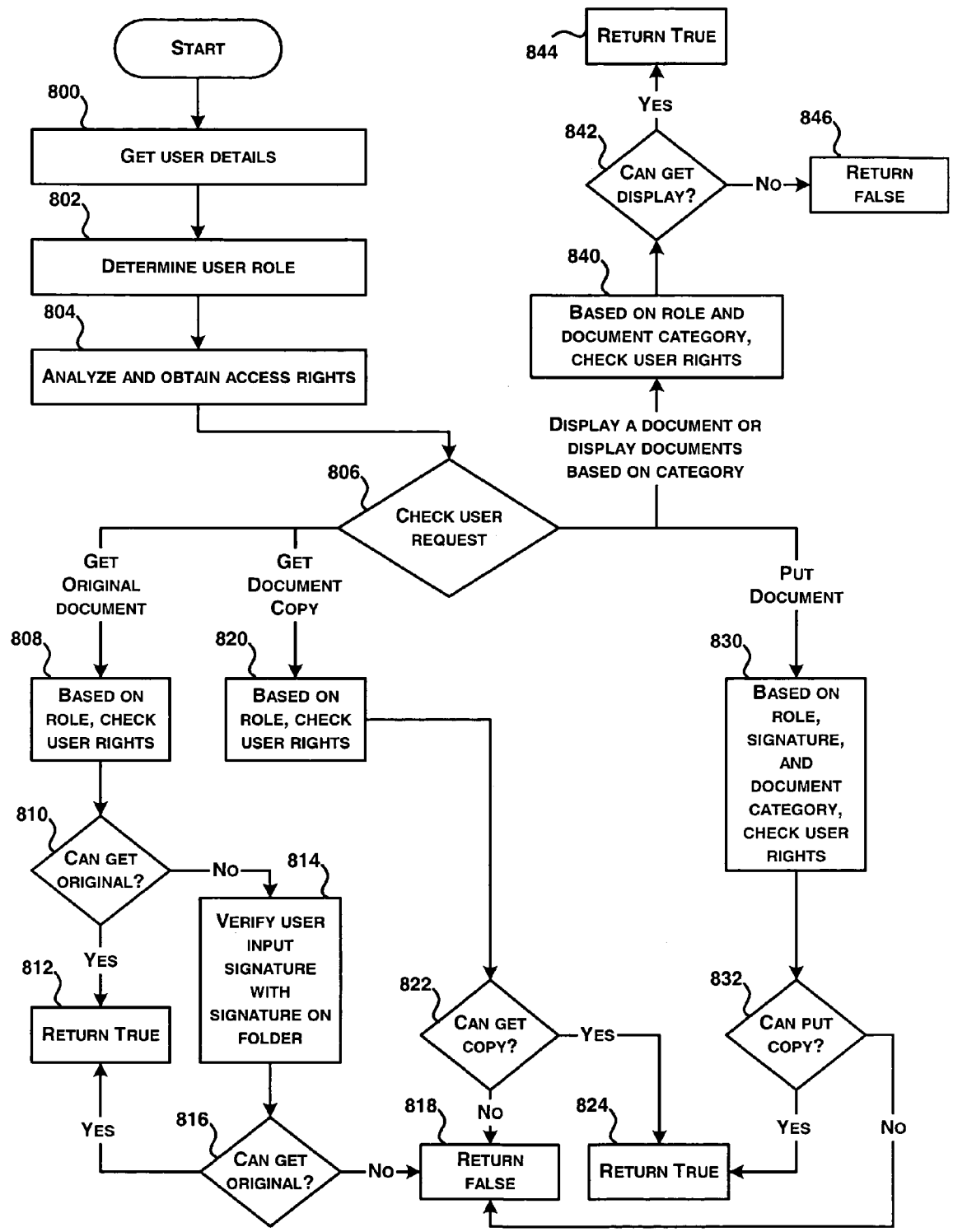
FIG. 8: ACCESS MANAGEMENT

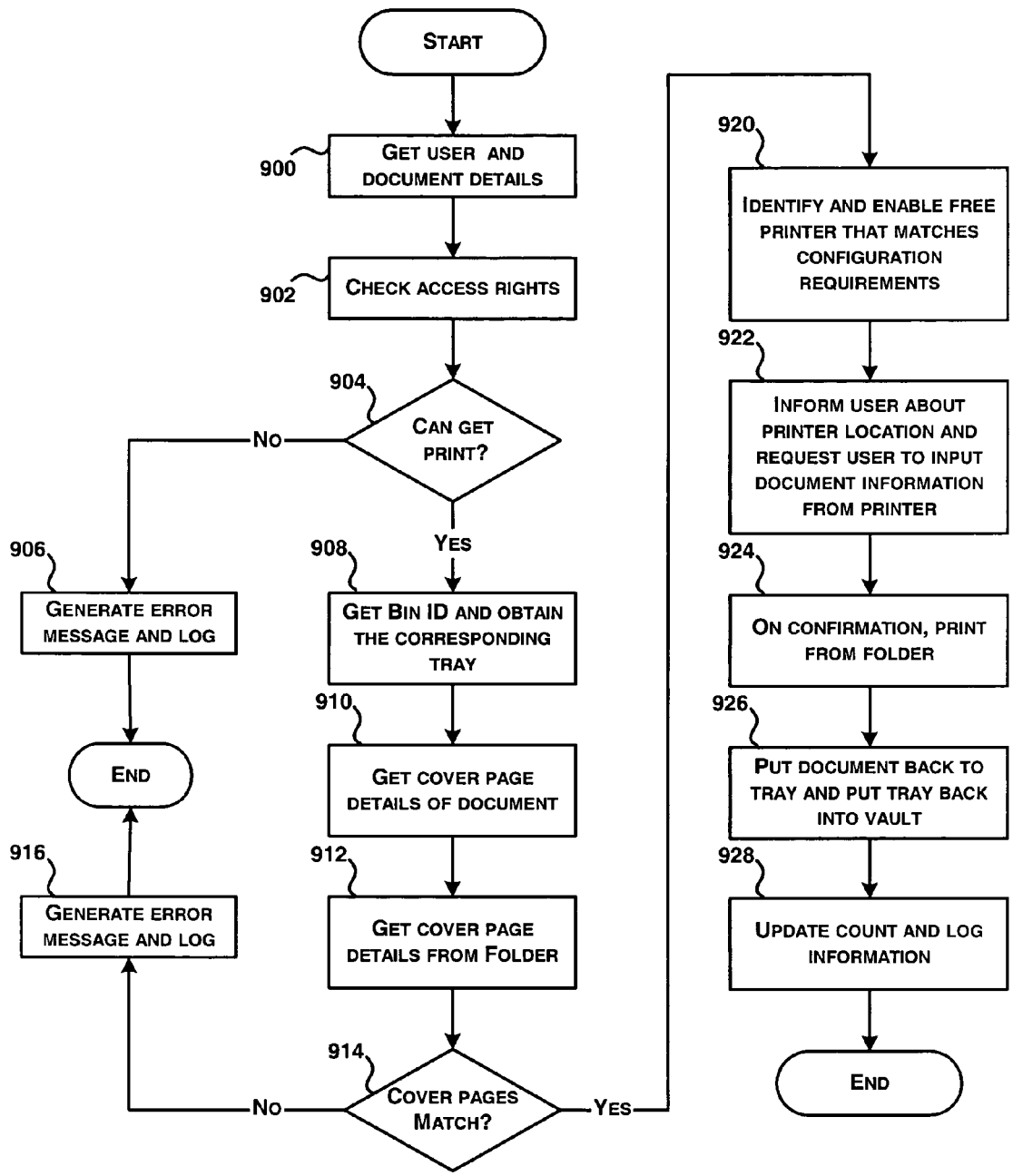
FIG. 9: PRINT MANAGEMENT

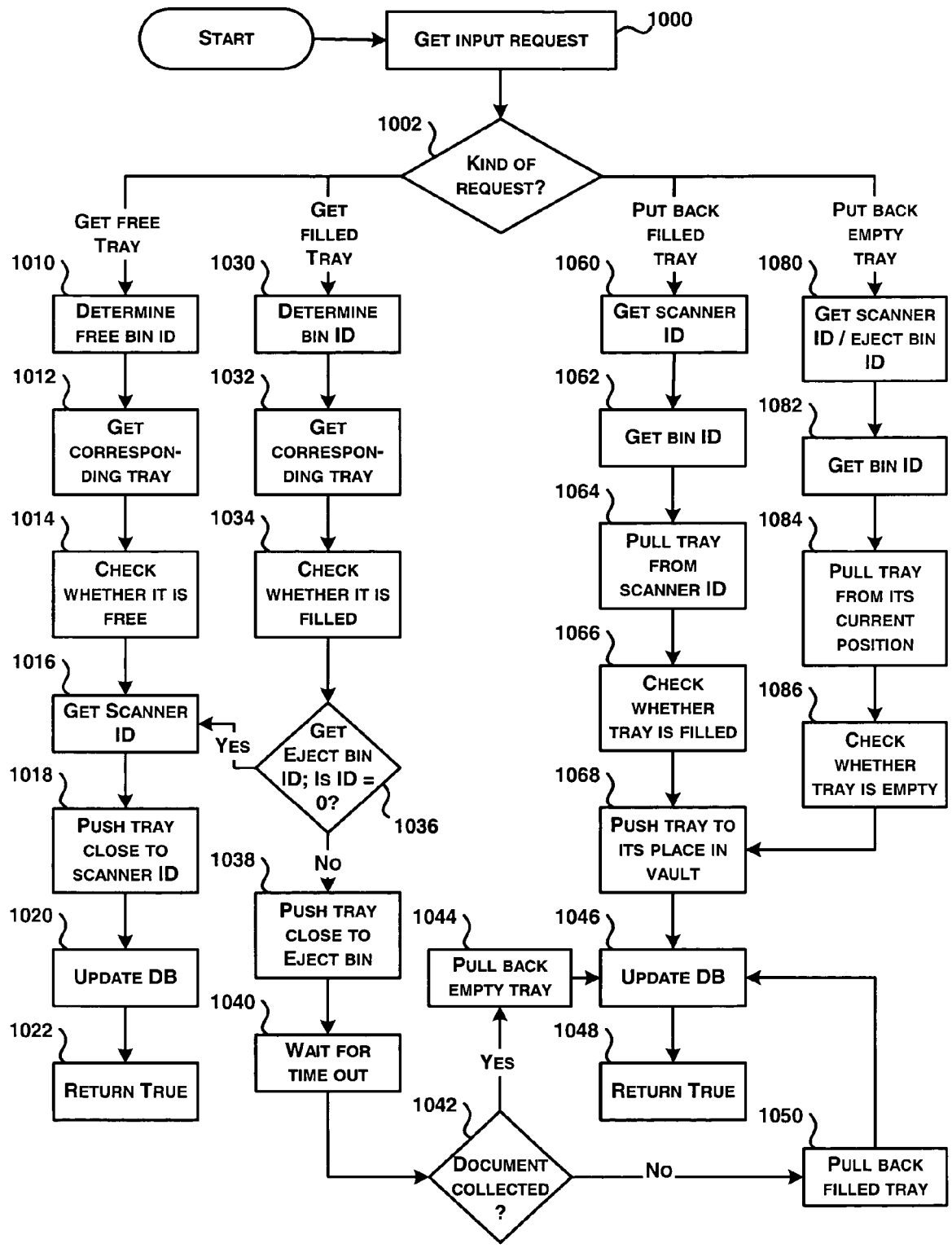
FIG. 10: VAULT MANAGEMENT

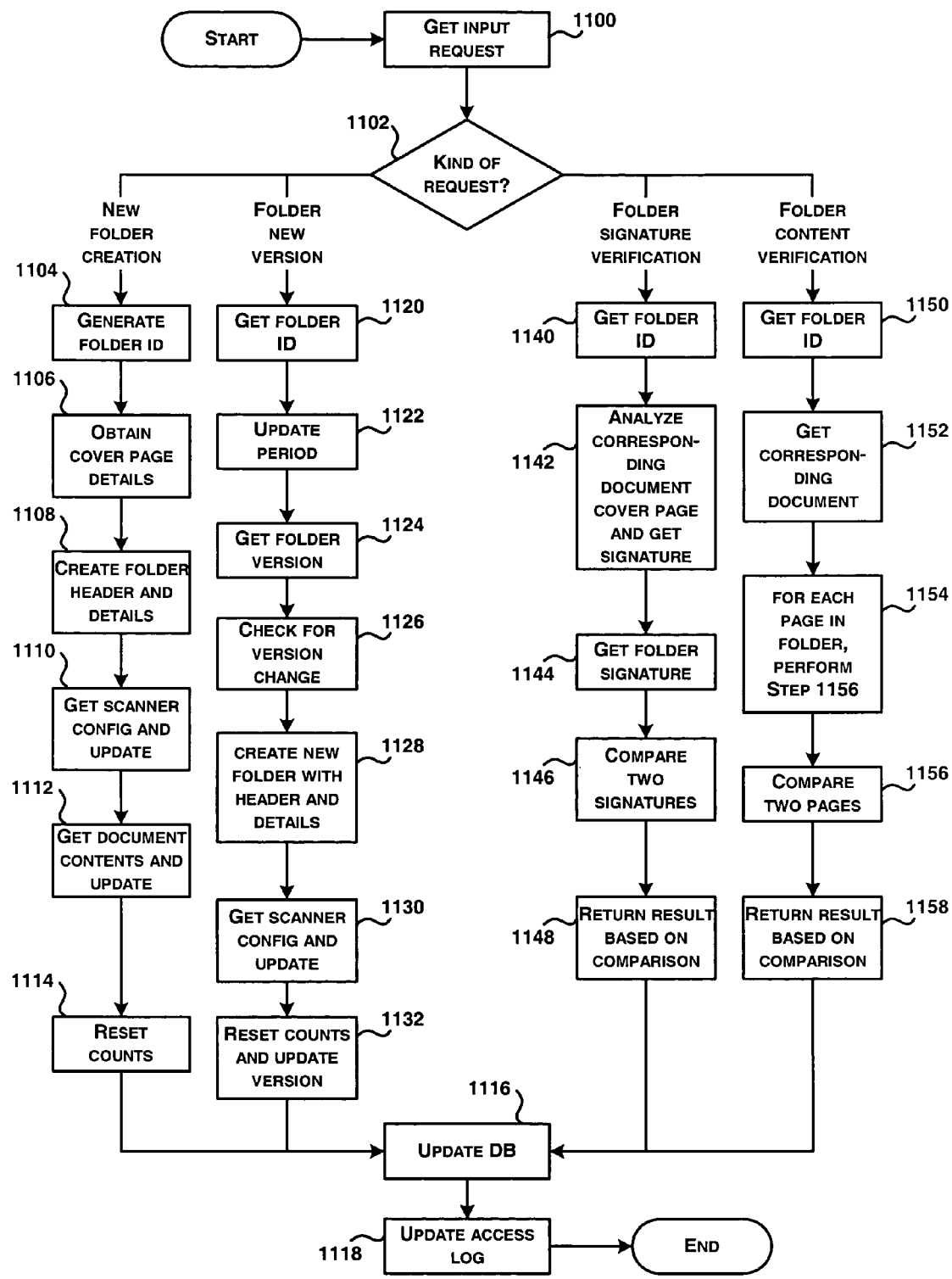
FIG. 11: FOLDER MANAGEMENT

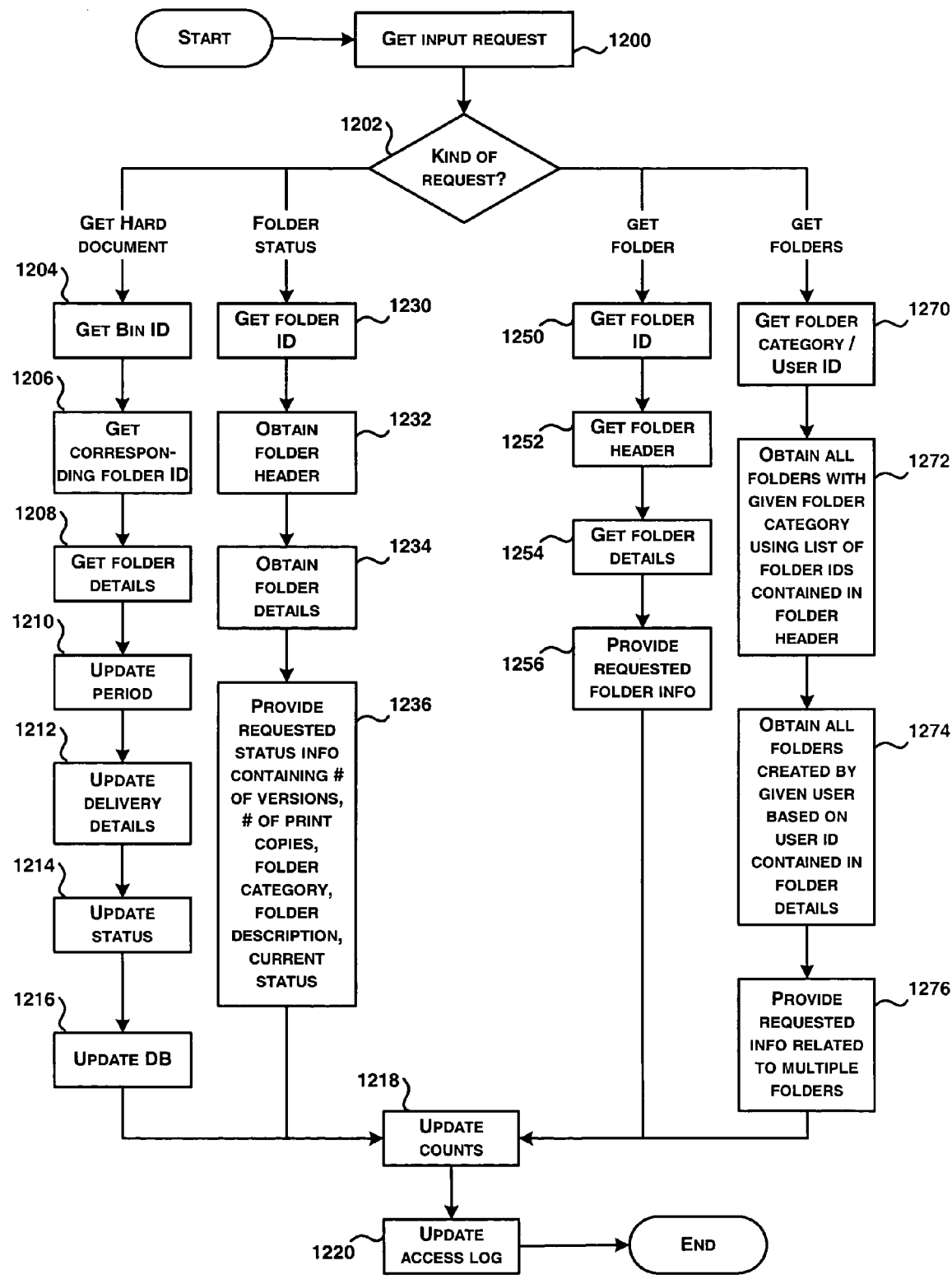
FIG. 12: FOLDER MANAGEMENT - ADDITIONAL FUNCTIONALITY

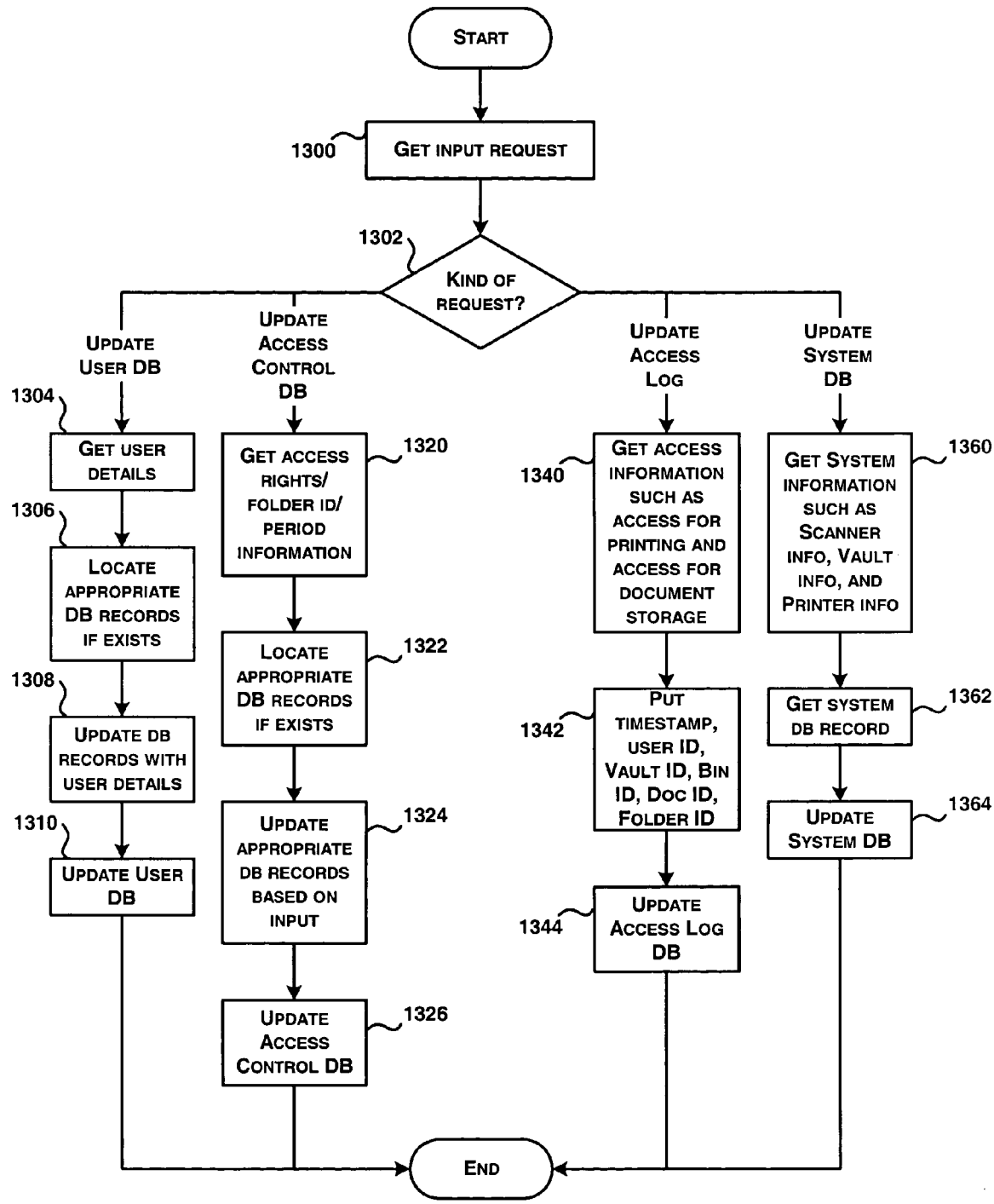
FIG. 13: DATABASE MANAGEMENT

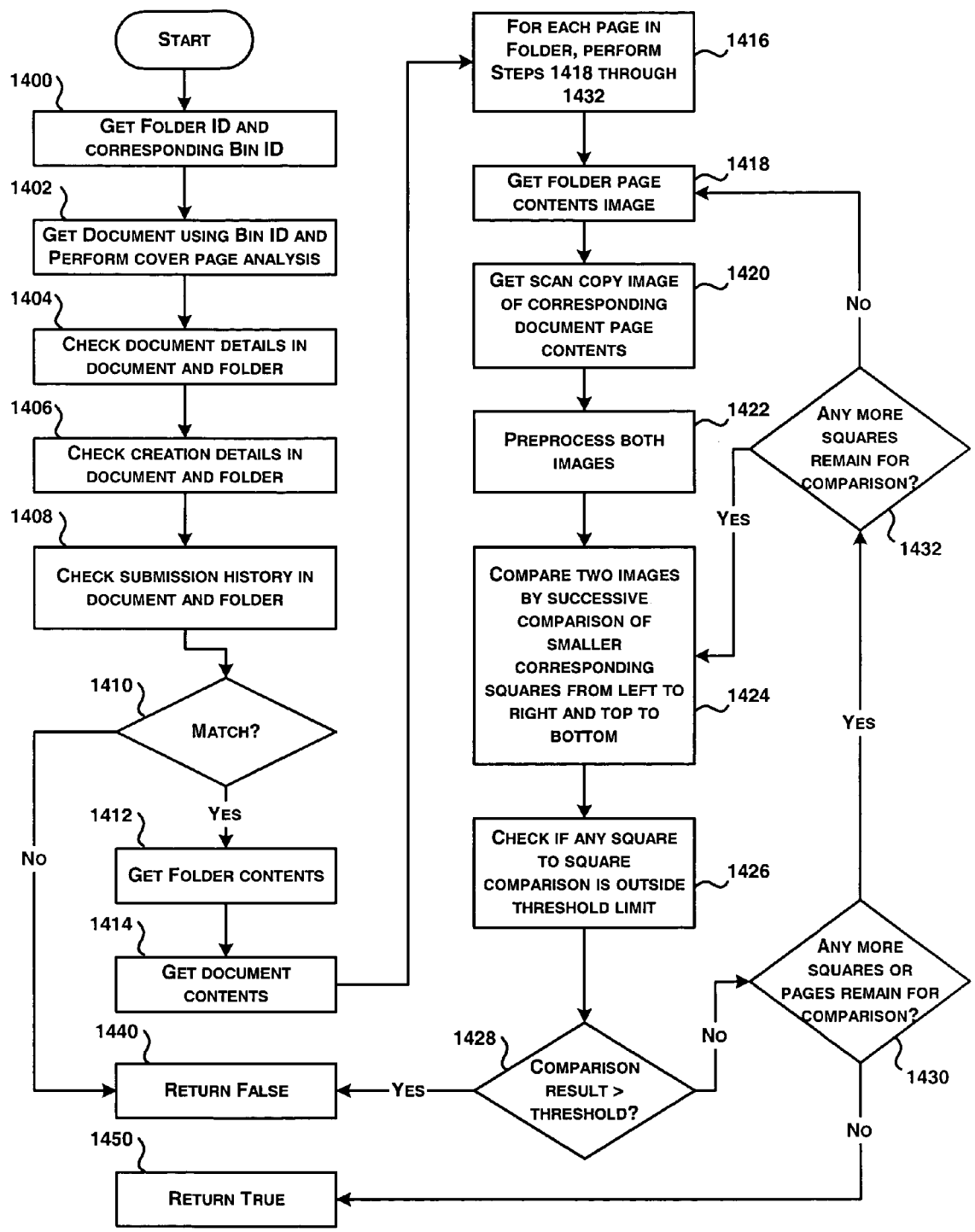
FIG. 14: DOCUMENT AND FOLDER COMPARISON

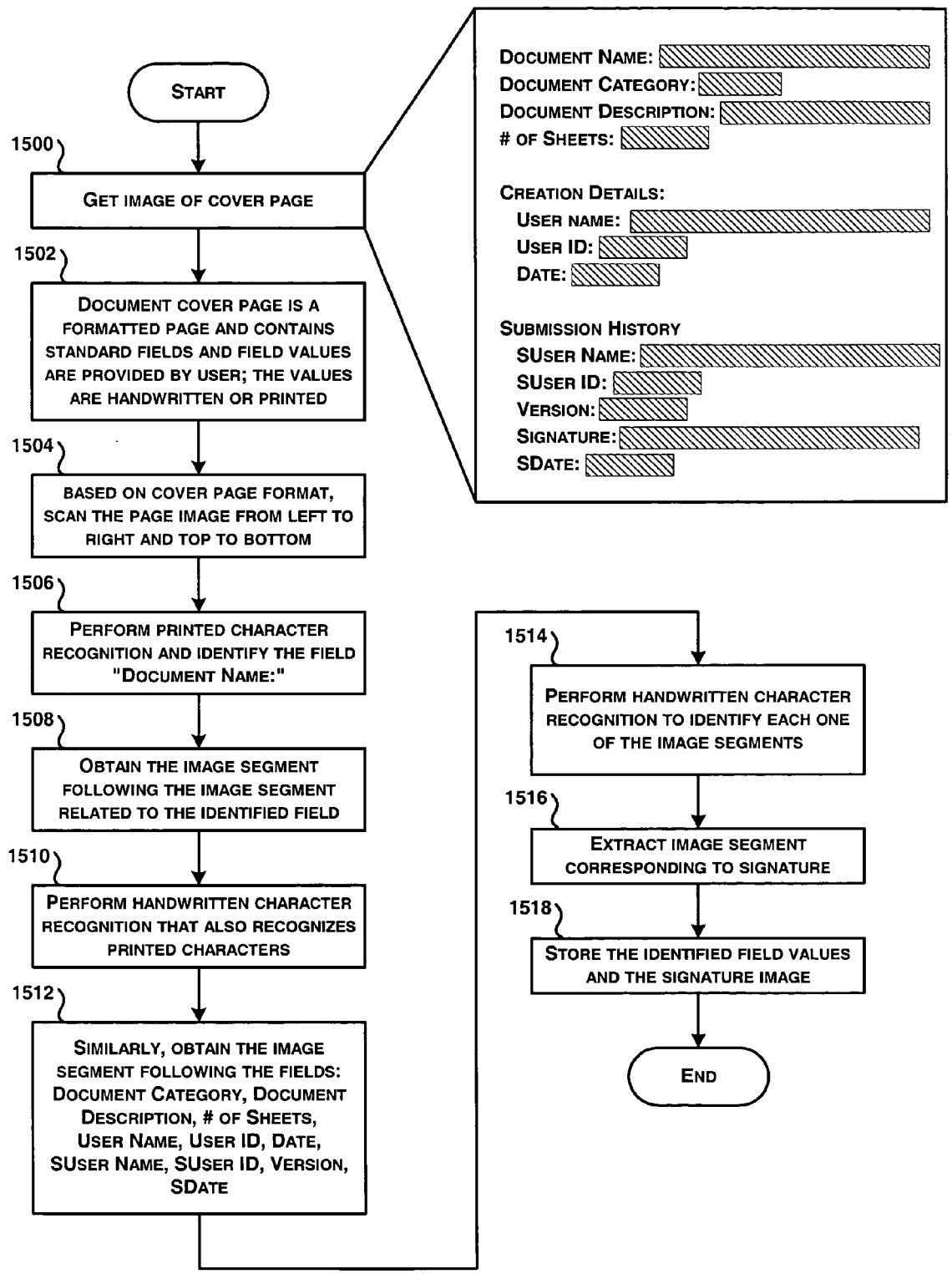
Fig. 15: Cover Page Analysis

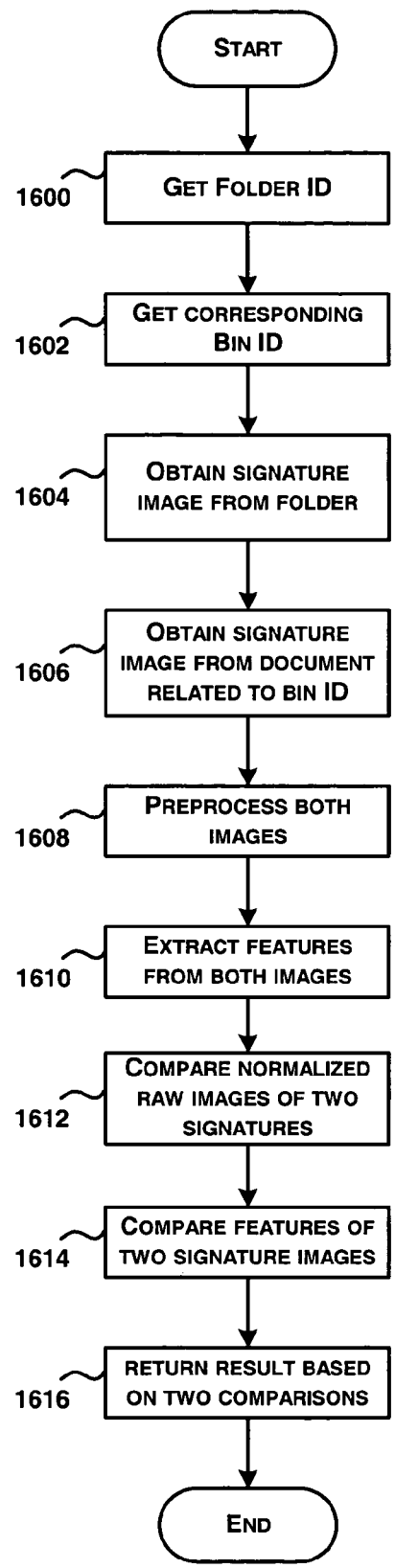
FIG. 16: SIGNATURE VERIFICATION

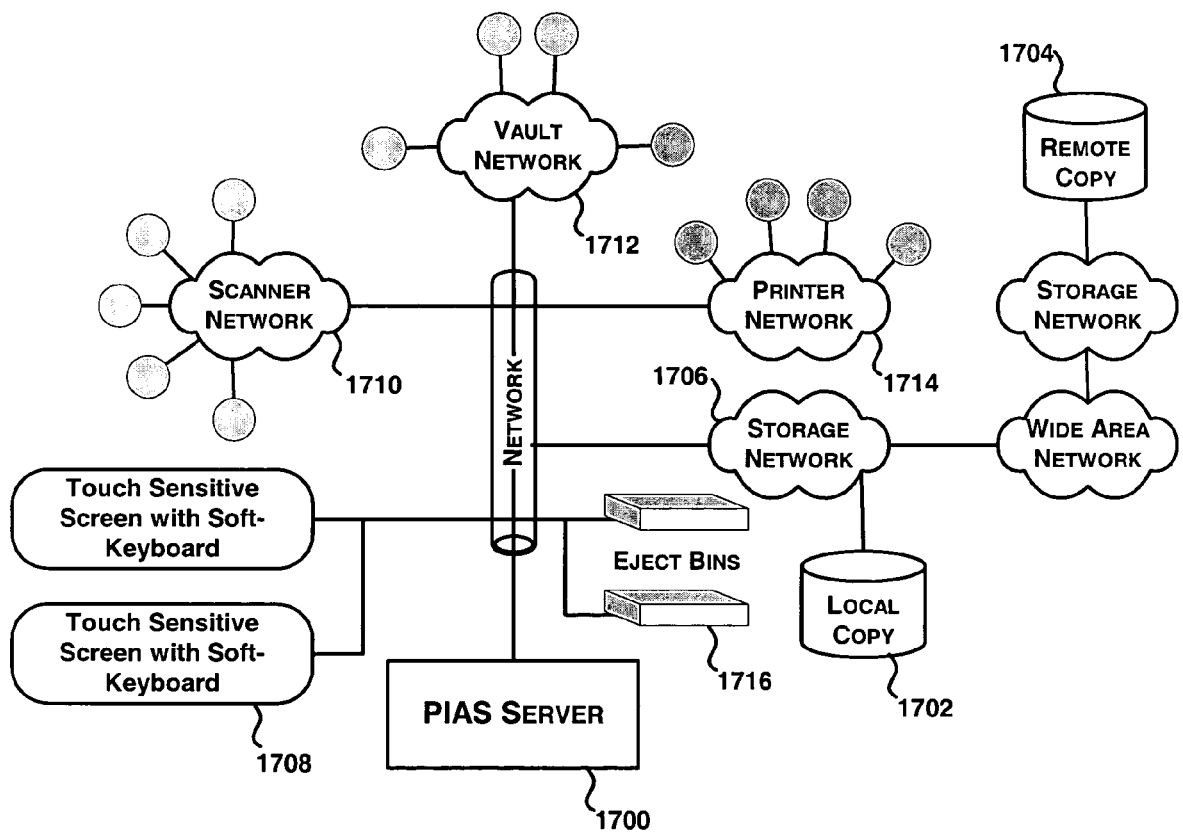
FIG. 17: PIAS NETWORK ARCHITECTURE

SYSTEM AND METHOD FOR AUTOMATIC INDEXING AND ARCHIVING OF PAPER DOCUMENTS

FIELD OF THE INVENTION

The present invention relates to the indexing and archiving of documents in general, and more particularly, indexing and archiving of documents consisting of a few sheets of paper in particular. Still more particularly, the present invention relates to a system and method for automatic indexing and archiving of paper documents in both hard and soft forms.

BACKGROUND OF THE INVENTION

Enterprises deal with a large number of papers related to the various kinds of agreements with their suppliers and customers. There is a need to preserve these documents in a proper condition for a pre-specified number of years in order to successfully carry out business. There are also the other kinds of legal documents that need to be preserved for a longer period of time as part of statutory requirements. These documents need to be taken out for modification purposes: additional signatures and additional sheets get added to an existing version of the documents. Auditing requirements and several business transactions necessitate the usage of these documents quite frequently. Manual handling of the documents for these purposes lead to the reduction in the useful life of the documents. However, statutory requirements and ongoing business relationships demand the preservation of the documents for a much longer period of time. Enterprises such as banks also deal with a large volume of paper documents. It is important to ensure that the documents received by a bank from its customers are stored in a secured way and returned back in the best possible conditions. Typically, in a bank, an identified branch offers the safe custody services to handle the documents of multiple branches of the bank.

Consider a business scenario involving an enterprise and a consultant. The consultant enters an agreement with the enterprise to provide consulting services and an agreement to this effect is reached between the two parties, and a suitable non disclosure agreement (NDA) and memorandum of understanding (MoU) are drafted for business and legal purposes. The initial term of validity of these two agreements is two years, and the agreements are appropriately signed and are stored. On providing the services to the enterprise, the consultant raises an invoice on the enterprise for payment purposes. Internally, within the enterprise, the invoice processing involves, apart from other documents such as work order and approvals, a copy of the MoU needs to be attached as a support document for the received invoice. This calls for obtaining a copy of the MoU and during such manual copying, the document needs to be handled carefully. As business relationship matures, it is required to extend the previously signed NDA and MoU. This requires, possibly adding an addendum to the original documents. Again, it is required to handle the documents carefully.

Under conditions when a soft copy of a document is maintained, with time, it becomes difficult to ensure that several copies are consistent with the original hard copy. Redundant copies create data integrity issues. Another equally important integrity issue arises in multi-office enterprises. In such an enterprise, typically, agreements are initiated by the individual offices, and are centrally controlled and managed by the head office. The documents are maintained centrally and it is required to keep track of the several agreements that get generated from the several branch offices. It is essential to maintain the same in a secured place due to the company confidential nature of these documents. On account of these factors, there is a need for securely storing both hard and soft forms of the documents so that (a) both soft and hard forms of the documents are available when needed; (b) consistency between soft and hard forms is maintained; (c) multiple document versions are tracked and managed; (d) controlled access is provided to both soft and hard forms of the documents; and (d) audit trails are maintained to ensure confidentiality of the stored documents.

Automating the indexing and archiving of paper documents requires the management of (a) scanners, to ensure that a reliable soft copy gets generated and to support audit verification, (b) printers, to ensure that a hard copy gets printed on demand, (c) vaults, to ensure that the original hard copy gets securely stored, (d) eject bins, to ensure that the original hard copy gets delivered on demand, and (e) scanned soft copies of paper documents, to ensure that multiple copies of a paper document get generated without resorting to the multiple times scanning of the original document.

DESCRIPTION OF RELATED ART

U.S. Pat. No. 5,978,477 to Hull; Jonathan J. (Cupertino, Calif.); Peairs; Mark (Menlo Park, Calif.); Cullen; John (Redwood City, Calif.); Baxter; Michael (Sunnyvale, Calif.) for "Automatic and transparent document archiving" (issued on Nov. 2, 1999 and assigned to Ricoh Company Limited (Ota-Ku, Tokyo, JP)) describes an automatic archiving system that makes document archiving transparent to users. In one embodiment, documents scanned or printed over a local area network are automatically archived.

U.S. Pat. No. 6,236,767 to Altman; Gerald (Newton, Mass.) for "System and method for storing and retrieving matched paper documents and electronic images" (issued on May 22, 2001 and assigned to Papercomp, Inc. (Newton, Mass.)) describes a system and method for scanning a paper document, and the paper document and its electronic image are assigned a unique identifier. The received paper documents are stacked in sequential folders, which in turn are stacked in sequential boxes.

U.S. Pat. No. 6,456,747 to Altman; Gerald (Auburndale, Mass.) for "Systems, processes and products for storage and retrieval of physical paper documents, electro-optically generated electronic documents, and computer generated electronic documents" (issued on Sep. 24, 2002 and assigned to Papercomp, Inc. (Newton, Mass.)) describes a system wherein, newly received or generated paper documents of different content classifications are simply scanned under the control of a digital processor at random in date/time order to produce corresponding electronic images, and the paper documents are stacked in sequential folders. The digital processor then can provide sets of electronic images that belong to selected content classifications for working purposes, and can indicate the locations of the paper documents in the folders and boxes whenever the need arises.

U.S. Pat. No. 6,628,412 to Jeran; Paul L. (Meridian, Id.); Mahoney; Terry P. (Boise, Id.) for "Methods of document management and automated document tracking, and a document management system" (issued on Sep. 30, 2003 and assigned to Hewlett-Packard Development Company, L. P. (Houston, Tex.)) describes a method for document tracking in which a printed document is printed with a machine-readable code and is stored in a database for tracking purposes. The document is scanned with a scanner machine to extract the machine-readable code and compared with the information in the database to track the document.

The known systems do not address the issue of automatically storing, indexing, and retrieval of documents, where a document is a collection of a few sheets of paper. The present invention provides with a system for automatically indexing and archiving of paper documents that ensures that the paper documents, in both hard and soft forms, are securely stored and delivered on need basis. Further, the present invention provides for maintaining consistency between soft and hard forms of paper documents.

SUMMARY OF THE INVENTION

The primary objective of the invention is to achieve an automatic indexing and archiving of documents, wherein a document is a collection of a few sheets of paper. This is achieved by storing hard copy documents in automatically accessible vaults and soft copy of the documents as folders in a database.

One aspect of the invention is to represent a document as cover page and a few sheets of paper, and maintain a unique mapping between hard form and soft form of the document, wherein the hard form is the original document, and soft form is the image of the original document.

Another aspect of the present invention is the management of scanners, wherein an appropriate scanner is used to obtain a soft copy of an input document and to manage multiple versions of the input document.

Yet another aspect of the present invention is to provide a controlled access to the stored documents and soft copies.

Another aspect of the present invention is to ensure consistency between a document and the corresponding soft form, and to provide a copy of a consistent document based on the corresponding soft form using an appropriate printer.

Yet another aspect of the present invention is to ensure an automatic storage and retrieval of the original documents.

Another aspect of the present invention is folder management, wherein a soft copy of the an original document is stored in a consistent and version controlled way.

Yet another aspect of the present invention is the verification of signature present in an original document and signature stored in the corresponding folder.

Another aspect of the present invention is the verification of content stored in a folder with respect to the content of the corresponding document stored in a vault.

Yet another aspect of the present invention is to determine version change in a document based on the analysis of the cover page of the document.

BRIEF DESCRIPTION OF THE DRAWINGS

FIG. 1 depicts the architecture of Paper Indexing and Archiving System (PIAS) along with the main components.

FIG. 2 depicts the key subsystems of PIAS system.

FIG. 3 depicts a typical workflow of PIAS system.

FIG. 4 provides a brief description of the various databases of PIAS system.

FIG. 5 provides the description of a folder and its relationship with a document.

FIG. 6 depicts role based access rights to access folders.

FIG. 7 describes the procedure related to Scan management.

FIG. 8 describes the procedure related to Access control management.

FIG. 9 describes the procedure related to Print management.

FIG. 10 describes the procedure related to Vault management.

FIG. 11 describes the procedure related to Folder management.

FIG. 12 describes the procedure related to the additional functionality of Folder management.

FIG. 13 describes the procedure related to Database management.

FIG. 14 describes the procedure related to the comparison of a document and the corresponding folder.

FIG. 15 describes the procedure related to cover page analysis.

FIG. 16 describes the procedure related to signature verification.

FIG. 17 depicts the network architecture of PIAS system.

DETAILED DESCRIPTION OF THE PREFERRED EMBODIMENTS

FIG. 1 depicts the system architecture of PIAS system (100). The system helps in storing the original documents intact in a secured vault. This is achieved by using a scanner (102) to scan an input document wherein the input document consists of a cover paper and a few sheets of paper. PIAS system is useful in office environments to help manage company confidential and legal documents. A company requires to make frequent references to the original version of a document during its day-to-day activities. Further, in a company with multiple branch offices, a document may need to be made available to the various branch offices on demand. Also, as many of these documents are company confidential, it is essential to ensure that the documents are delivered to the right recipients. On account of these requirements, both scanner and printer are equipped with ways of obtaining user identity before either accepting a document or delivering a document. The other important requirement is to manage multiple versions of the documents. This is achieved by comparing the cover page of a version of a document with the cover page of an earlier version. A scanner is used to accept an input document and in order to locally bind the input document with a user, the user is requested to reprovide the identity using an appropriate input device that is part of the scanner. The accepted input document is put onto a tray with a unique bin ID (104) and is moved to a pre-defined location with in a vault (106). This movement of the tray from a place near a scanner to its location within a vault is managed by vault control subsystem and is constantly monitored by PIAS server (108). The server is responsible for enabling an appropriate scanner, for instructing vault control subsystem to route an empty tray to near the scanner, and finally putting the tray with the input document back into the vault. Such a centralized monitoring ensures that adequate access control mechanisms are enforced and access logs get generated. In order to meet the repeated requests for copies of the stored documents, PIAS stores the scanned copy of the documents in a database (110) and manages a set of printers to generate copies on demand. A printer is controlled by PIAS server, and is enabled on need basis, user identity is accepted, and a copy of a document from the database is printed on the printer (112). Again, the repeated acceptance of the user identity ensures that the document is not gathered by a stranger and also addresses the situations wherein the printers are geographically distributed. The delivery of the original documents is through eject bins that are a part of vault control subsystem and managed by PIAS server (114). The generated access logs are stored in a database (116) and is used to generate audit trails. Touch sensitive screen with soft keyboard (118) helps in obtaining user and document information for validation and storing purposes.

FIG. 2 depicts the various subsystems of PIAS system. The system takes a hard copy document as input through a scanner (200) and related inputs from a user terminal (202). Based on the user request, a copy of a document is provided via a printer (204) or the original document is delivered via an eject bin (206). In order to facilitate the various functionalities of PIAS system, the original documents are stored in a vault (208) and a soft copy of the same are stored in a folder database (210). Scan control and management subsystem controls and manages multiple,scanners to facilitate the input of documents by users (212). Both input of a document and retrieval of copies and the original document are based on a user's access rights and Access control and management subsystem ensures that the access to the documents is consistent with the defined access rights (214). A user's request for a copy of a document is managed by Print control and management subsystem that manages multiple printers and ensures that print copy is delivered to the right user (216). The input documents are stored in a secured vault that is managed by vault control and management subsystem and the documents are indexed to facilitate retrieval of a requested document (218). Furthermore, a soft copy of the input documents are stored in a folder database and are version controlled to help generate copies of the documents on need basis (220). Finally, the database management subsystem manages the data related to access logs, access rights, and system information (222).

FIG. 3 describes a typical workflow related to PIAS system. The workflow depicts the major functions of the system and indicates the process of management of the input documents.

FIG. 4 provides a brief description of a few important elements of some of the databases of PIAS system. 400 represents Folder Header DB and consists of information related to a document such as description, category, creation and version information, and some statistical information. 402 represents Folder Details DB and consists of information related to a particular version of a particular document such as document ID, signature, version details, number of sheets contained in the document, bin related information, scanner and printer information, and a soft copy of the document. 404 represents User DB and consists of user details such as role and signature. 406 relates to access control information and consists of information such as access rights of users and period of validity. 408 relates to bin database and consists of information related to document in a bin and associated folder details. 410 represents Vault DB and consists of information such as number of bins that are part of a vault, and their availability. 412 relates to system database and consists of information related to scanners, printers, and eject bins. Finally, 414 relates to access log information and contains information such as bin and/or folders accessed along with user information.

FIG. 5 provides the description of a folder. A folder is the soft counterpart of a document and consists of the document in a soft form for (a) displaying on the screen for verification purposes; and (b) printing a copy for processing purposes. 500 depicts a document with a cover page, and one or more sheets of paper. Cover page consists of details such as document description, category, number of sheets of paper contained in the document, document creation history, and document submission history (502). Corresponding to each page of a document, a soft form, in the form of page image, is generated (504) and the original document gets into a vault while the soft copy of the document gets into a folder database.

FIG. 6 depicts the distribution of folders with respect to a role hierarchy. Each document has a document category that gets stored in a folder database as folder category. The access rights are defined with respect to roles so that the users with appropriate roles are allowed access to appropriate folders and the corresponding documents. A role hierarchy allows an aggregation of folders from a leaf node towards the root node.

FIG. 7 describes the procedure related to scanner control and management. The input document needs to be properly validated and stored in a vault. In order to ensure consistency, an additional input regarding a document is provided by the user through a user terminal and this input is used for comparison with the field values extracted from the cover page of the input document. Get user and document details (700) and get cove page details (702). If the input document is a new document (704), the new document needs to scanned, verified, and put into a vault, and in order to perform scanning, a free scanner needs to be identified and enabled (710). The scanners are typically kept in disabled state to avoid misuse. The enabled scanner configuration is determined and subsequently stored in the database (712). An image generated by a scanner is dependent on the scanner parameters and hence, the stored parameters are used to reconfigure a scanner during repeated scanning of the same document for audit purposes to obtain a reasonably similar images. As the final objective is to store the input document safely in a vault, a free bin in the vault is identified and the tray corresponding to the free bin is pushed closer to the scanner (714). Before accepting the input document, it is required to verify that the right user is inputting the document using the enabled scanner. Receive user information from the front panel of the scanner (716) and verify the same with the information provided earlier by the user (718). After ensuring credibility, initiate the scanning of the multiple sheets of the input document (720). On successful scanning, perform cover page analysis to get cover page details as contained in the input document and verify it with the information input by the user (722). Get the document into the tray, lock the tray to ultimately put the same back into the vault, and update database (724). Finally, disable the scanner (726) and update access details into the log database (728). On the other hand, if the input document is a revision of a previously processed document (704), obtain the previous scan configuration from Folder database (730). Determine and enable an appropriate free scanner, and set the configuration with the obtained configuration information (732). Perform Steps 714 through 728. Use the scanned information and the information contained in the folder database to ensure that the document is indeed a revised version of a previously processed document. Such a consistency verification is required to manage successfully the multiple versions of a document.

FIG. 8 describes the procedure related to access control and management. Obtain user details (800) and get user role from the database (802). Get user access rights based on role and from the database (804). If the user request is to get original stored document (806), check whether the user is eligible to obtain the original document based on access rights (808). Different access rights include (a) provide a document created by a user to the user; (b) provide a document created by a user with a particular role to a user who is above this user with respect to the role hierarchy; and (c) get a document copy or display based on role. If the document can be made available (810), return true (812). Else, verify the user signature with the one on the folder (814), and if they match (816), then return true (812) and otherwise, return false (818). On the other hand, if the request is to get a copy of a document (806), based on user role and the role of the user who created the document, check whether the document can be made available (820). If so (822), return true (824). Else, return false (818). On the other hand, if the user request is to input a document (806), based on role, signature, and document category, check the user rights (830). If the user is eligible to input a document (832), return true (824), else return false (818). Finally, on the other hand, if the user request is to get one or more documents displayed (806), based on role and document category, check the user rights (840). If the user can get a display of one or more documents (842), return true (844). Else, return false (846).

FIG. 9 describes the procedure related to print management. Obtain user information and information about a document whose copy needs to be printed (900). Based on user role and the document category, check the access rights of the user (902). If the user is not eligible for obtaining print (904), then generate error message and log details (906). Otherwise, get bin id and retrieve the corresponding tray (908). Get cover page details of the document (910) and the corresponding cover page details from the folder (912). Compare the two cover pages (914) and if they do not match, generate error message and log details (916). Otherwise, identify and enable a free printer that matches the configuration requirements (920). Inform the user about the printer location and request the user to input document information using the printer front panel (922). On confirmation of the validity of the input information, initiate the printing of a copy of the document on the printer (924). Put the document back into the tray and put the tray back into the vault (926). Finally, update the count and log information (928).

FIG. 10 describes the procedure related to vault control and management. The main objectives of this procedure are to (a) get a free tray so as to put a new document into the vault; (b) get a filled tray for printing or delivering purposes; (c) put the filled tray back after either the retrieved document is printed or a new document has been put into the tray; and (d) put back an empty tray into the vault after the document contained in the tray has been delivered. Get the input request of a user (1000). If the request is to get a free tray (1002), determine free bin ID using vault database (1010). Get the corresponding tray (1012) and make sure that the tray is indeed free without any document (1014). As the intent of getting a free tray is to put a new input document into the vault, obtain information about the scanner that has been enabled for scanning the document (1016). Push the tray from the bin inside the vault to a pre-defined position near the scanner (1018). Update the database (1020) and return true (1022).

On the other hand, if the request is to get a filled tray (1002), determine the bin ID containing the required tray (1030) and get the corresponding tray (1032). Check whether the tray contains a document (1034). Get Eject bin ID and check whether it is zero (1036). If it so, then the intent in getting a filled tray from the vault is to verify the document for consistency before generating a copy of the same and hence, perform Steps 1016 through 1022. Otherwise, Eject bin ID is non-zero (1036) and the intent is to deliver the original document to the user. Push the tray close to the target eject bin with ID as Eject bin ID (1038). Wait for a pre-defined time for the user to pick up the delivered document (1040). If the document is collected within a timeout period (1042), then pull the empty tray back into the vault (1044), update DB (1046), and return true (1048). If the document is not collected within the timeout period (1042), then pull back the filled tray (1050), update DB (1046), and return true (1048). On the other hand, if the request is to put back a filled tray (1002), get scanner ID to determine the location from where the tray needs to be pulled back (1060). Obtain the bin ID that indicates the position of the tray within the vault (1062). Pull the tray from a pre-defined position close to the scanner (1064) and check whether the tray is filled (1066). Push the tray to its destination bin in the vault (1068). Update database to indicate the current status of the vault (1046) and return true (1048). Alternatively, if the request is put back an empty tray (1002), get scanner ID or Eject bin ID (1080). The intent is to pull back an empty tray into its position in the vault after either a successful delivery or an unsuccessful document input. Obtain the bin ID that indicates the position of the tray within the vault (1082). Pull tray from its current position (1084) and check whether the tray is empty (1086). Push the tray to its destination bin in the vault (1068). Update database to indicate the current status of the vault (1046) and return true (1048).

FIG. 11 describes the procedure related to folder management. A folder gets created for every document that is input to the system and different folder versions are created as document undergoes several changes. A folder contains adequate information about a document such as creation details, submission history, document category, number of sheets in the document, version information, period of validity of the document, and delivery details. In order to ensure that the folder contents and document contents are consistent, adequate matching of two forms of content is done at various levels: signature, cover page, and full document level. Get input request (1100) and the request is one of creation of a new folder, version change of an existing folder, signature verification, or full content verification. If the input request is for folder creation (1102), then a unique folder ID is generated to store the details of the input document (1104). The cover page details are obtained from the information provided by the user through the user terminal (1106). The folder header and folder details are appropriately updated (1108), and the configuration information of the scanner that is used to input the document into PIAS system is obtained and stored as part of the folder details (1110). The scanned copy of the input document is stored as part of the folder details (1112). The count information that is part of the folder details is reset as the input document is a new document (1114), the database is suitably updated (1116), and access details are logged (1118). If the input request is related to the change in version of an existing folder (1102), the folder ID of the folder containing the earlier version of the document information is obtained (1120). The need for folder version change arises whenever there is a change in the version information of the corresponding document. The period of a folder indicates the duration between the creation of a version and the creation of the next version, and is suitably updated whenever there is a version change (1122). The folder version is obtained (1124) and the input version change information is validated with respect to the existing version information (1126). A new folder ID is obtained, and the folder header is suitably updated and the folder details of the new folder ID are also suitably updated (1128). Get scanner configuration information and update the folder details (1130). Reset counts and update version information (1132), update database (1116), and finally, update access logs (1118). On other hand, if the request is related to folder signature verification (1102), then the required folder ID is obtained (1140). The requirement is to verify whether the signature on the document cover page and the signature contained in the corresponding folder match. For this purpose, the signature on the cover page of the document contained in a bin associated with folder ID is obtained (1142). Obtain the signature image stored in the folder (1144). Compare these two signatures (1146) and return the result based on the extent of match (1148). Finally, update database (1116) and update access logs (1118). Alternatively, if the requirement is to verify folder contents (1102), then the required folder ID is obtained (1150). Get the corresponding document (1152). For each page in the folder, perform Step 1156 (1154). Compare the two corresponding pages (1156). Return the result based on the extent of match of the multiple pages in the document (1158), and finally, update database (1116) and update access logs (1118).

FIG. 12 describes an additional procedure related to folder management. Get input request and the input request is one of obtaining an original document, the status of a folder, or details of one or more folders. If the input request is related to obtaining an original document (1202), then the corresponding bin ID is obtained (1204). The folder Id of a folder corresponding to the document under consideration is also obtained (1206). Obtain the folder details (1208) and update the period as the original document is being delivered (1210). Also, update the delivery details (1212). Update the status of the document as delivered (1214). Finally, update database (1216), update counts (1218), and update access logs (1220). On the other hand, if the input request is to get folder status (1202), obtain the folder ID of the required folder (1230). Obtain folder header (1232) and folder details (1234), and provide the requested status information containing version information, count information, folder category, and user information (1236). Finally, update counts (1218) and update access logs (1220). If the input request is to obtain a copy of a folder (1202), get folder ID (1250). Get folder header (1252) and folder details (1254), and provide the requested folder information (1256). Finally, update counts (1218) and update access logs (1220). Alternatively, if the input request is for multiple folders (1202), get folder category or user id (1270). Obtain multiple folders based on folder category if folder category is provided as input (1272) and obtain multiple folders based on user ID if user ID is provided as input (1274). Provide the requested information related to multiple folders (1276). Finally, update counts (1218) and update access logs (1220).

FIG. 13 describes the procedure related to database management. Get input request (1300). If the input request is to update user database (1302), then get user details (1304), based on the details, determine the database records that need to be modified (1306), update these records (1308), and finally update user database (1310). On the other hand, if the input request is for access control database updation (1302), then get information related access rights, folder id, and period information (1320). Locate the appropriate database records that need to be modified (1322) and appropriately update the database records (1324). Finally, update access control database (1326). If the input request is for updating access logs (1302), then get access information such as access for printing and access for document storage (1340). Put timestamp, user id, vault id, bin id, doc id, folder id, scanner id, printer id, eject bin id as appropriate (1342) and update access log database (1344). Alternatively, if the request is to update system database (1302), then get system information such as scanner information, vault information, and printer information (1360). Get system database record (1362) and update system database (1364).

FIG. 14 describes the procedure related to the comparison of contents of a document and the corresponding folder. The comparison is performed during an audit trail to ensure that contents of a bin and the corresponding folder match. Get folder ID and the corresponding bin ID (1400). Get document using bin ID from the vault and perform cover page analysis (1402). Use the results of cover page analysis (a) to check whether the document details, such as document name and document description, in the document and the folder match (1404); (b) to check whether the creation details in the document and the folder match (1406); and (c) to check whether the submission history in the document and the folder match (i408). If there is a match (1410), get the folder contents (1412) and get the document contents (1414). For each page in the folder, perform Steps 1418 through 1432 (1416). Get folder page contents (1418) and get scan copy image of the corresponding page in the document (1420). Preprocess both images (1422). Preprocessing is done account for skew and lighting aspects, and the images are appropriately normalized to account for environmental and scanner factors. Compare two images by successive comparison of smaller corresponding squares from left to right and top to bottom (1424). Check if any square to square comparison is outside the threshold limit (1426). If it is not so (1428), check whether any more squares or pages remain for comparison (1430). If so, check whether any more squares remain for comparison. If so, continue from Step 1424. Else, continue from Step 1418. If no more squares or pages remain for comparison (1430), return true (1450). If any square to square comparison result is outside the threshold (1428), return false (1440). If the matching of cover pages fail (1410), then return false (1440).

FIG. 15 describes the procedure related to cover page analysis. The objective of the cover page analysis is to obtain the information about a document contained in the cover page of the document and this obtained information is used to ensure the consistency between the document and the corresponding folder contents by comparing the cover page information in the document and in the folder. Get cover page image (1500). Document cover page is a formatted page and contains standard fields, and the values for these fields are provided by a user (1502). These values are either handwritten or printed. Based on cover page format, scan the page image from left to right and top to bottom (1504). Perform printed character recognition to identify the printed field "Document Name:" (1506). Obtain the image segment following the image segment related to the identified field (1508). Perform handwritten character recognition that also recognizes printed characters (1510). Similarly, obtain the image segment following the fields: "Document Category," "Document Description," "# of Sheets," "User Name," "User ID," "Date," "SUser Name," "SUser ID," "Version," and "SDate" (1512). Perform handwritten character recognition to identify each of the image segments (1514). Extract the image segment corresponding to the signature (1516). Finally, store the identified field values and the signature image (1518).

FIG. 16 describes the procedure related to the comparison of signatures contained in a document and the corresponding folder. This comparison is performed to ensure that a document and the corresponding folder are consistent. Get folder ID (1600) and the corresponding bin ID (1602). Obtain the signature image from the folder (1604) and the signature image from the document related to bin ID (1606). Preprocess both signature images (1608). Preprocessing is done account for skew and lighting aspects, and the images are appropriately normalized to account for environmental and scanner factors. Extract features from both the images (1610). The features provide an elegant way of representing signature and overcome some of the limitations of the byte-by-byte comparison. Compare the normalized raw images of two signatures (1612) and compare the features of two signature images (1614). Return result based on the two comparisons (1616).

FIG. 17 describes the network architecture of PIAS system. PIAS server is connected to the rest of elements through a network (1700). The database that contains the critical folder details are stored on a local database (1702) and also on a remote database (1704). These two databases are connected via a storage network to facilitate easier switching over to the remote copy if there is any problem with the local copy (1706). In order to facilitate the use of PIAS system in transaction heavy environments, multiple, homogeneous peripherals are used and these peripherals are effectively managed by forming a network of these peripherals. The multiple, touch sensitive user terminals form a terminal network (1708). Similarly, scanners form their own network (1710), vaults form a vault network (1712), printers form a printer network (1714), and eject bins form their own network (1716).

Thus, a system and method for automatic indexing and archiving of paper documents has been disclosed. Although the present invention has been described particularly with reference to the figures, it will be apparent to one of the ordinary skill in the art that the present invention may appear in any number of systems that perform indexing and archiving of papers in both hard and soft forms. It is further contemplated that many changes and modifications may be made by one of ordinary skill in the art without departing from the spirit and scope of the present invention.

What is claimed is:

1. A system for automatic indexing and archiving of a plurality of paper documents in both hard and soft forms, said system comprising:

a version management subsystem for managing a plurality of versions of a paper document, wherein the system is configured to scan each of said plurality of versions of said paper document at different times, wherein the version management subsystem is configured to manage the plurality of versions of said paper document based on a "Version" field contained in a cover page of each of said plurality of versions of said paper document;

a consistency verification subsystem for managing consistency of an archived paper document, wherein said archived paper document comprises a cover page and a plurality of pages, wherein the consistency verification subsystem is configured to manage consistency of the archived paper document based on consistency verification of said cover page and each of said plurality of pages; and a cover page analysis subsystem for analyzing the cover page of a paper document, wherein, said cover page comprises a plurality of fields comprised of "Document Name:", "Document Category:", "Document Description:", "# of Sheets:", "User Name:", "User ID:", "Date:", "SUser Name:", "SUser ID:", "Signature:", and "SDate:", and wherein the cover page analysis subsystem is configured to perform said analysis based on extracting said plurality of fields along with the corresponding values from said cover page.

2. The system of claim 1, wherein said version management subsystem comprises means for managing a plurality of versions of a paper document comprising scanning of a cover page with a pre-defined format of said paper document, analyzing of an image of said cover page, identification of the "Version" field of said pre-defined format in said image, identification of an image segment following the "Version" field of said pre-defined format in said image, recognizing of a plurality of characters in said image segment, determination of a document version number of said paper document based on said plurality of characters, determination of a folder corresponding to said paper document, obtaining of a folder version number of said folder, and creation of a new folder based on said document version and said folder version.

3. The system of claim 1, wherein said consistency verification subsystem comprises means for managing consistency between a paper document stored in a vault and a folder stored in a database comprising comparison of document details in said paper document and said folder, comparison of creation details in said paper document and said folder, comparison of submission history in said paper document and said folder, pre-processing of a document page image of a page of said paper document, pre-processing of a folder page image of a page of said folder, wherein said folder page image corresponds with said document page image, comparison of said document page image and said folder page image, and comparison of image of each of plurality of pages of said paper document with image of corresponding page of a plurality of pages of said folder.

4. The system of claim 1, wherein said cover page analysis subsystem comprises means for analyzing the cover page in a pre-defined format of a paper document comprising obtaining of a plurality of field names in said pre-defined format, obtaining of a plurality of image segments, wherein each of said plurality of image segments follows a field name of said plurality of field names in said paper document, recognition of a plurality of characters in each of said plurality of image segments, and extraction of signature image based on signature field in said pre-defined format in said paper document.

* * * * *